Oct. 9, 1945.　　　R. M. WHITMORE　　　2,386,376
MAGAZINE TESTING MEANS
Filed Dec. 22, 1941　　　4 Sheets-Sheet 1
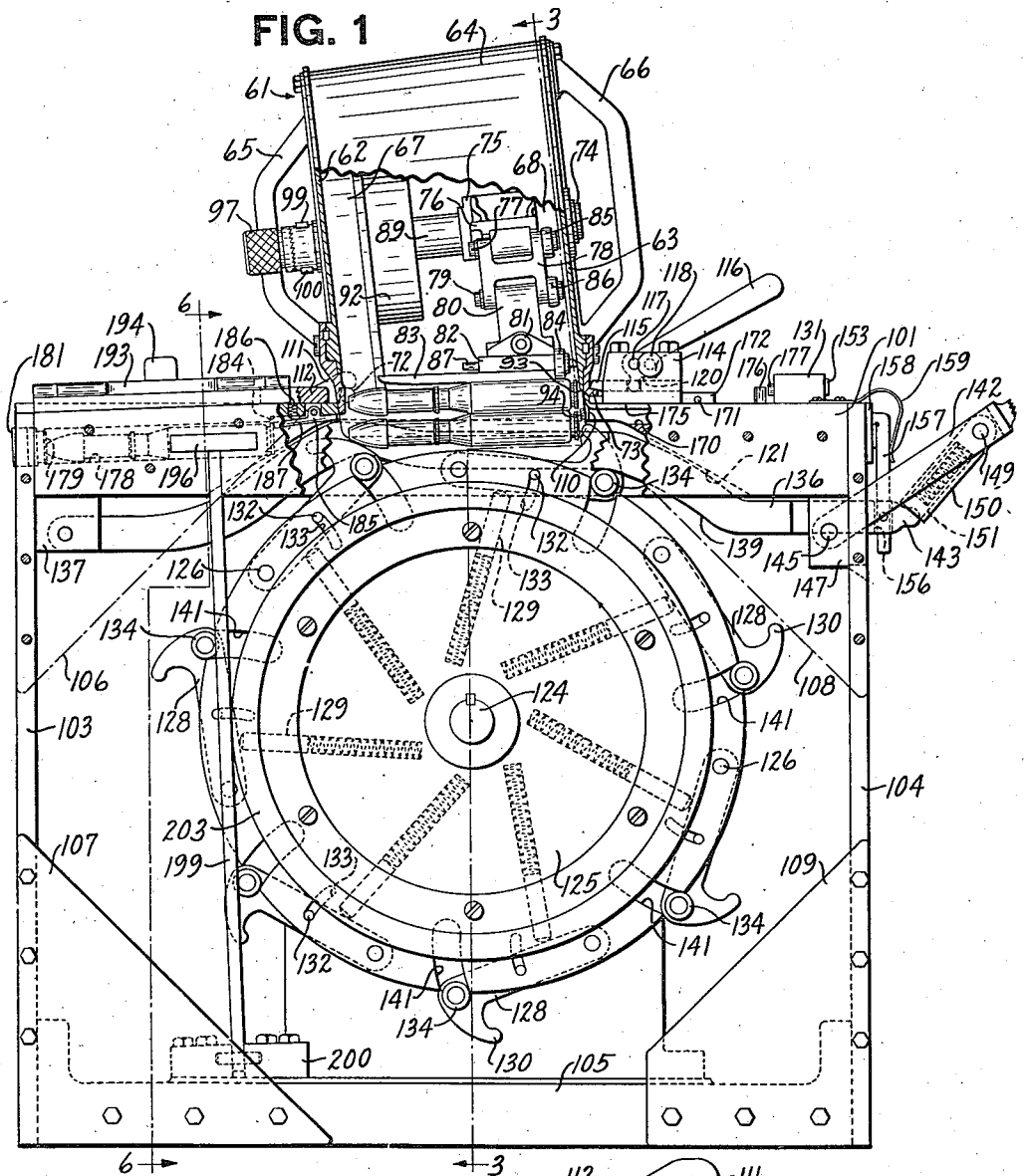
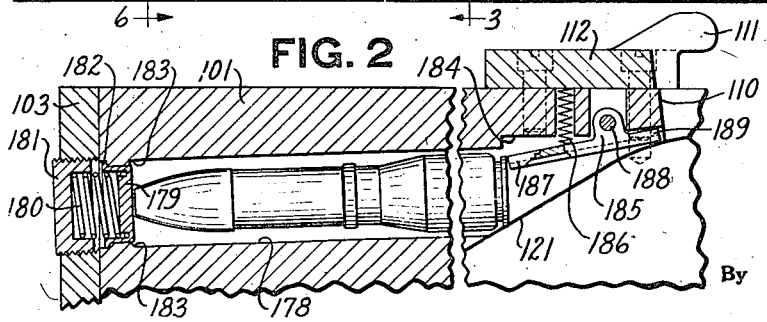
Robert M. Whitmore
Inventor
By Earl Beust
His Attorney Oct. 9, 1945.   R. M. WHITMORE   2,386,376
MAGAZINE TESTING MEANS
Filed Dec. 22, 1941   4 Sheets-Sheet 2
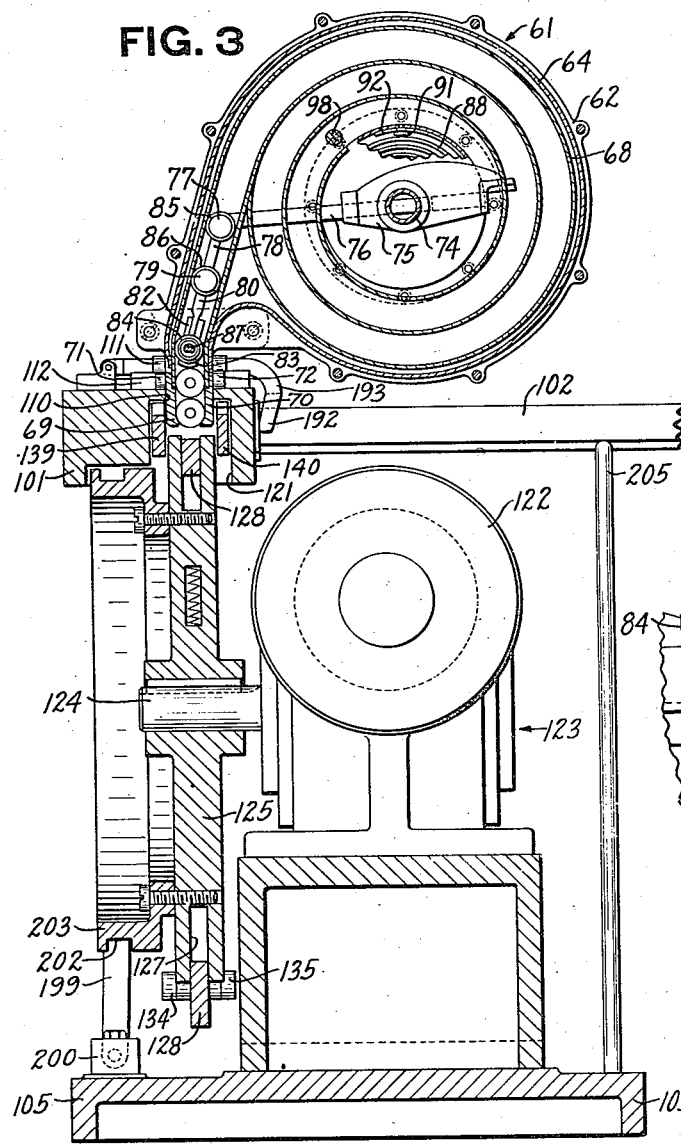
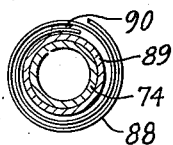
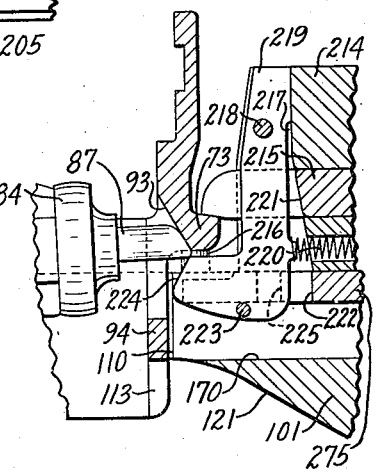
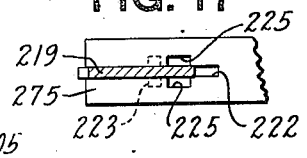
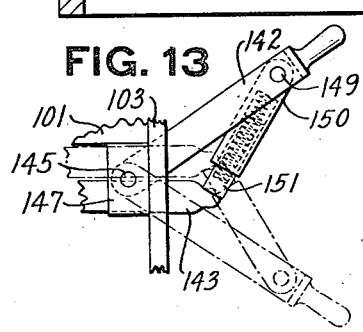
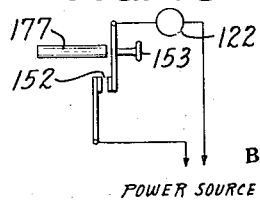
Robert M. Whitmore
Inventor
By *Carl Benst*
His Attorney Oct. 9, 1945.   R. M. WHITMORE   2,386,376
MAGAZINE TESTING MEANS
Filed Dec. 22, 1941   4 Sheets-Sheet 3
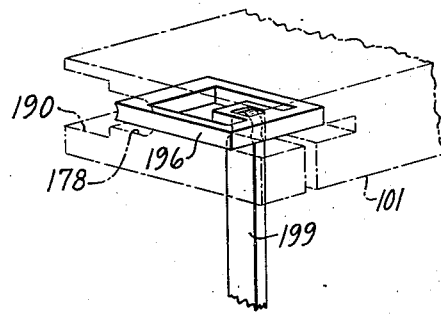
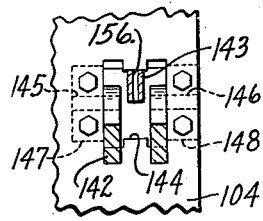
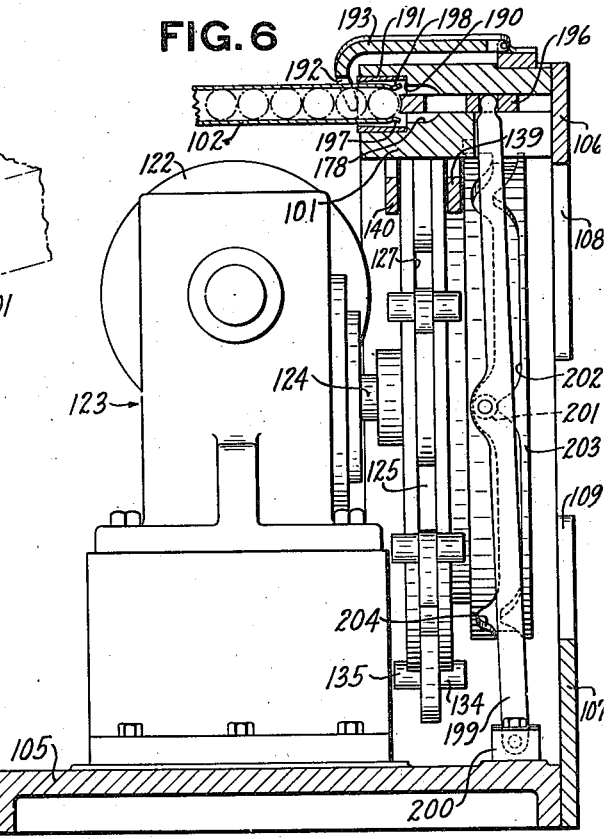
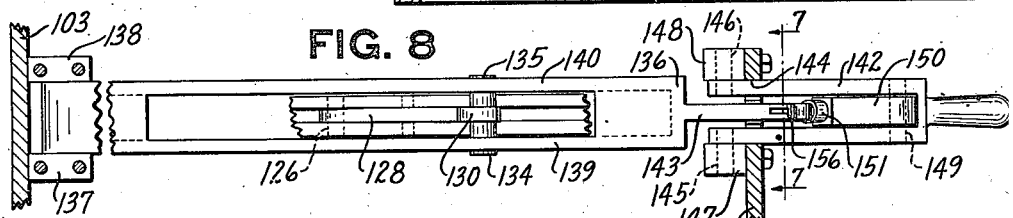
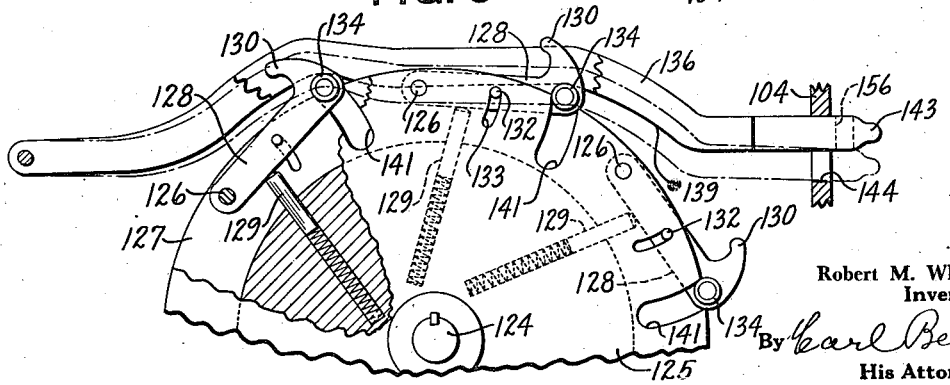
Robert M. Whitmor
Inventor
By Earl Beust
His Attorney Oct. 9, 1945.     R. M. WHITMORE     2,386,376
MAGAZINE TESTING MEANS
Filed Dec. 22, 1941     4 Sheets-Sheet 4
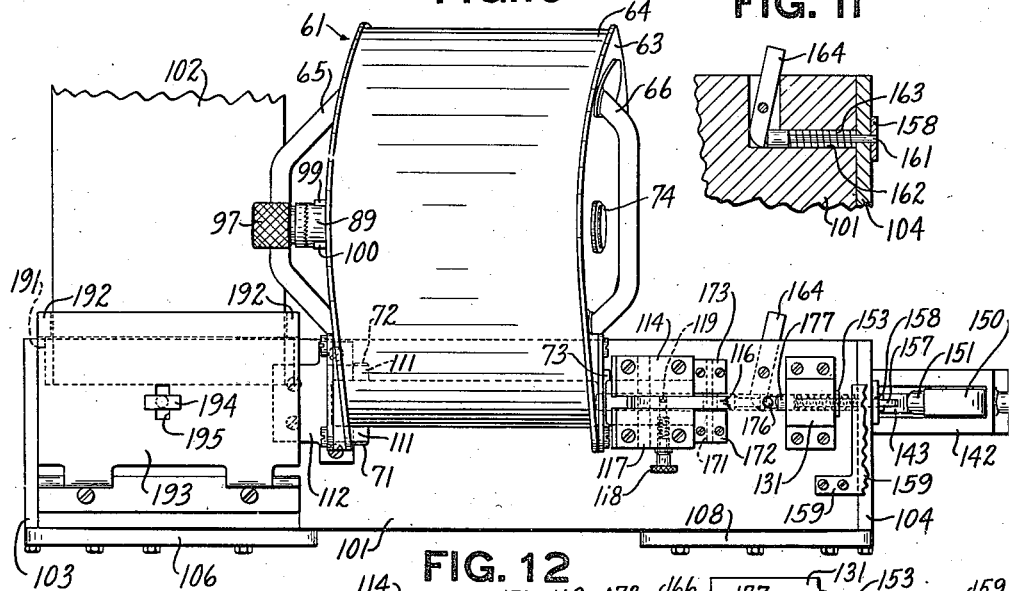
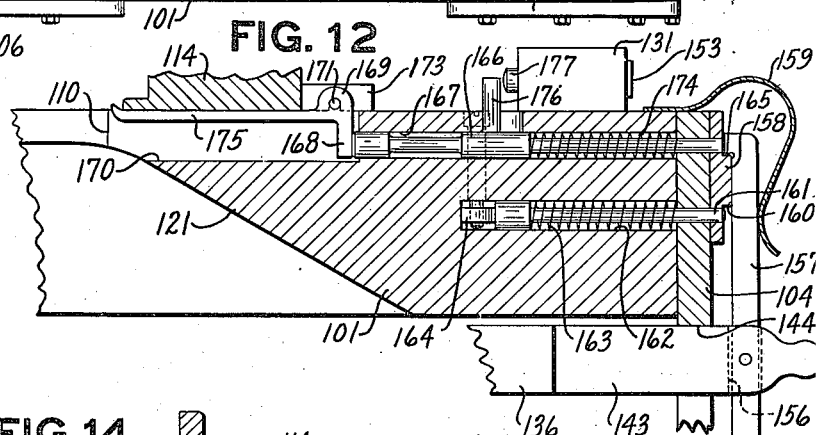
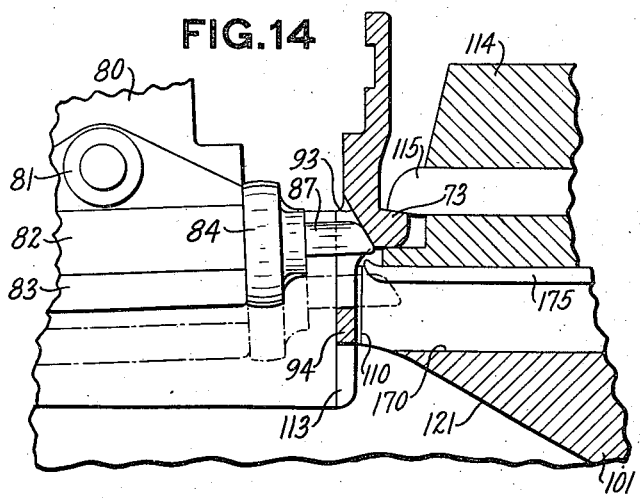
Robert M. Whitmore
Inventor
By *Earl Beust*
His Attorney Patented Oct. 9, 1945

2,386,376

UNITED STATES PATENT OFFICE 2,386,376

MAGAZINE TESTING MEANS

Robert M. Whitmore, Dayton, Ohio, assignor to The National Cash Register Company, Dayton, Ohio, a corporation of Maryland Application December 22, 1941, Serial No. 423,982

23 Claims. (Cl. 73—167)

This invention relates to a mechanism for testing the operation of cartridge magazines for use with repeating firearms under conditions approximating actual use.

The testing mechanism shown is used to test the operation of drum-type magazines used with the well-known Oerlikon gun. These magazines contain spring-urged feeding means for feeding the cartridges to the mouth of the magazine, whence they are fed to the gun, and, as the gun operates at a very high rate of speed, it is essential that this feeding means shall operate perfectly to present the cartridges to the mouth of the magazine as fast as they are to be used by the gun; otherwise the gun may fail to receive a cartridge from the magazine and become uncocked and require a special operation to recock it and prepare it for further firing. As the cartridge feeding means operates to feed the cartridges into the mouth of the magazine, the tension of its driving spring decreases, and, unless the spring tension is sufficient when the last few cartridges are fed into the mouth of the magazine, they will not be fed thereto as fast as is necessary in order to supply the gun properly.

A plunger carried by the feeding means moves through an opening in the mouth of the magazine when the last cartridge is removed from the magazine and serves as an indication that the magazine is empty. When the plunger has moved through the opening in the mouth of the magazine, it cooperates with means in the gun to prevent the gun from firing further when there are no more cartridges in the magazine to be fed thereto. It is necessary that this plunger engage the means in the gun to prevent the firing of the gun when the magazine is empty, because, if the last cartridge taken from the magazine is fired when there are no other cartridges available to be fed into the gun, the gun will become uncocked and require a special operation to recock it and prepare it for further firing.

Thus it is seen that the cartridge feeding means must feed cartridges to the gun as fast as they are used, and the plunger must operate to prevent the firing of the last cartridge taken from the magazine, in order to prevent the gun from becoming uncocked and requiring a special, time-consuming, and difficult operation to recock it for further firing.

In order to insure that the mechanisms in the cartridge magazine are working properly to feed all the cartridges to the gun as fast as they are needed and to indicate when the magazine is empty, it has been customary to place a loaded magazine on a gun and fire the gun as in actual use, but this practice is expensive because of the cost of the cartridges and because a firing range or other suitable structure must be provided.

The present invention is directed to a mechanism for mechanically ejecting dummy cartridges from the magazine at the same speed at which the cartridges would be fired and ejected from the gun, for testing the operation of the cartridge feeding means to determine whether the spring has sufficient strength to operate the feeding means to feed the last few cartridges into the mouth of the magazine at a speed which would be required if the magazine were used on a gun, and for testing whether the plunger has come through the mouth of the magazine.

By mechanically ejecting dummy cartridges from the magazine, the testing mechanism can be used practically any place to test the magazine under conditions approximating actual use and does not require the use of a rifle range or any special construction which would be necessary if cartridges were actually fired from the gun during the test. A receptacle catches the dummy cartridges which are ejected from the mechanism, so that they can be used over and over again.

This novel testing means, therefore, provides a cheap means for testing the operation of the magazine by eliminating the necessity for any special construction, as a rifle range, and by eliminating the cost of the cartridges which would be used in actual firing if the actual firing of the cartridges were necessary.

It is broadly an object of this invention to provide a mechanism to test the operation of a cartridge magazine cheaply.

It is a further object of this invention to provide a mechanism testing the operation of a cartridge magazine without consuming any cartridges during the test.

Another object of this invention is to provide a mechanism to test the operation of the cartridge magazine without requiring the firing of cartridges from a gun.

Another object of the invention is to provide a mechanism to test the operation of a cartridge magazine, which mechanism can be used anywhere and does not require a rifle range or any special construction.

Another object of the invention is to provide a mechanism for testing whether a spring which operates a cartridge feeding means in a cartridge magazine has sufficient tension to feed the last cartridges to the mouth of the magazine fast enough to supply a gun properly with an uninterrupted flow of cartridges.

Another object of the invention is to provide a mechanism to test whether the tension in a spring which operates a cartridge feeding means in a cartridge magazine exceeds a predetermined value after the magazine has been unloaded by the cartridges having been ejected therefrom under conditions approximating those occurring in the actual use of the magazine on a gun.

Another object of this invention is to test whether a means which signals when the magazine is empty has operated properly.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 1 is a side elevation of a testing mechanism with a magazine and a clip attached, partially sectioned to illustrate some of the details better.

Fig. 2 is a sectional view showing in detail the means for stopping an ejected cartridge and for preventing its rebound.

Fig. 3 is a view through the testing mechanism and magazine, partially sectioned along the line 3—3 in Fig. 1 and looking in the direction of the arrows.

Fig. 4 is a detail view of a fragment of the spiral spring for actuating the feeding means in the magazine.

Fig. 5 is a perspective showing of a slide for pushing ejected cartridges into a clip.

Fig. 6 is a sectional view through the testing mechanism and a clip, taken along the line 6—6 in Fig. 1 and looking in the direction of the arrows.

Fig. 7 is a section taken along the line 7—7 in Fig. 8.

Fig. 8 is a plan view of the member for controlling the operation of the ejecting fingers.

Fig. 9 is a side elevation, partially in section, showing the ejecting means and the control member.

Fig. 10 is a plan view showing the testing mechanism with a magazine and a clip attached thereto.

Fig. 11 is a sectional view showing in detail a manual means for releasing a latch to initiate an ejecting operation.

Fig. 12 is a detail view, partially in section, showing certain of the means for controlling the automatic operation of the control member.

Fig. 13 is a detail view of a simplified form of means for positioning the control member, in which means the automatic controls have been eliminated.

Fig. 14 is a detail sectional view showing a portion of the mouth of the magazine and the indicating plunger in the positions which it assumes before and after the ejection of the last cartridge from the magazine.

Fig. 15 is a schematic diagram of the motor circuit.

Fig. 16 is a detail sectional view showing a portion of the mouth of the magazine and adjacent means for controlling the operation of the signal control means.

Fig. 17 is a plan view of a portion of a signal operating member, showing a locking pawl associated therewith.

DETAILED DESCRIPTION

Magazine

The magazine shown generally at 61 (Figs. 1, 3, and 10) is formed by a left-hand side plate 62 and a right-hand side plate 63 properly spaced by a cover plate 64, which is clamped between said side plates by bolts extending between the plates. Suitable handles 65 and 66 are fastened to said side plates to enable the magazine to be carried or placed in operating position.

The side plates 62 and 63 extend into the mouth of the magazine 61 and have thereon spiral strips 67 and 68, respectively, which form spiral channels from the mouth of the magazine toward the center of the magazine for guiding and supporting the cartridges when the magazine is loaded. The mouth of the magazine coincides with one end of the spiral channels, and its construction is such that it is open for insertion and removal of the cartridges one at a time and lengthwise only on the left-hand side of the magazine, because the walls 69 and 70 (Fig. 3) of the mouth extend inwardly for a portion of their length and act as a support for the cartridges, which are urged thereagainst by a spring-urged feeding means to be described hereinafter. The right-hand side of the mouth of the magazine is formed with an opening 93 (Figs. 1 and 14), which is closed at the bottom by a web 94.

The mouth also has, near the left-hand end thereof (Figs. 1, 3, and 10), a pair of studs 71 and 72 extending from the walls 69 and 70, respectively, and at the right-hand end has a lip 73 (Figs. 1 and 14). The studs 71 and 72 and the lip 73 cooperate with means on the gun to hold the magazine in place on the gun.

The spring-urged feeding means for the cartridges will now be described. A hollow spindle or shaft 74 (Figs. 1, 3, 4, and 10) is journaled in the center of the side plates 62 and 63 and has secured thereto a bearing member 75. The bearing member 75 and the shaft 74 have registering slots adapted to slidably receive a bar 76 carrying a stud 77, to which is pivoted the upper end of a link 78. A stud 79 pivotally connects the lower end of the link 78 to another link 80 pivotally connected by a stud 81 to a block 82 (Figs. 1 and 3) formed with a finger 83 adapted to resiliently engage the first cartridge in the spiral channels, as shown in Fig. 3. The block 82 carries a roller 84, while the studs 77 and 79, respectively, rotatably support the rollers 85 and 86, which rollers 84, 85, and 86 are arranged to roll freely in the spiral channels formed by the spiral strip 68, to guide the block in said channel. The links 78 and 80 form a flexible connection between the bar 76 and the block 82, so that said block may readily be driven by the shaft 74 in any of the positions which the block 82 may occupy in the spiral channel. The matching slots in the shaft 74 and the bearing member 75 (Fig. 3) permit the bar 76 to move in and out as the rollers 84, 85, and 86 travel around the spiral channel.

The cartridge feed block 82 also carries a plunger 87, which is spring-urged to engage the side plate 63 and to move into the opening 93 in the mouth adjacent the said plate 63, as shown in full lines in Fig. 14, when the feeding means has fed the last cartridge in the magazine into position to be fed into the gun.

After the last cartridge has been removed from the magazine, the feeding means will move downward a slight distance, as shown in dot-and-dash outline in Fig. 14, until it is arrested by the plunger 87 engaging the web 94 in the right-hand side of the mouth.

The plunger, when extending through the opening 93 in the mouth, is used to indicate that the magazine is empty and to cooperate with means in the gun to prevent the operation of the gun.

Tension is applied to the shaft 74 (Fig. 3), the bearing member 75, the bar 76, and the block 82 by a flat spiral spring 88, which is similar to a heavy clock spring and which urges said parts, including the block 82, in a counter-clockwise direction, as viewed in Fig. 3, to constantly urge the cartridges toward the mouth of the magazine 61. The flat spring 88 is connected to the shaft 74 and the associated parts in the following manner:

Free on the shaft 74 (Figs. 1 and 4) is a sleeve 89 having lugs, as 90, which engage corresponding slots in the internal end of the spring 88, while the external end of said spring is connected by rivets, as 91 (Fig. 3), to the inside surface of a drum 92 secured to the left-hand side plate 62 of the magazine, said drum forming a housing for the spring 88.

The left-hand end of the sleeve 89 (Fig. 1) has a plurality of combined ratchet and clutch teeth adapted to cooperate with similar teeth of the right-hand end of the clutch sleeve 97, which is supported for longitudinal sliding movement on the shaft 74 and is spring-urged into engagement with the sleeve 89. The clutch sleeve 97 is connected to the shaft 74 by clutch slots adapted to engage corresponding clutch tenons formed on the periphery of the shaft 74. The clutch sleeve 97, therefore, forms a connection between the spring-tensioned sleeve 89 and the shaft 74 and the parts operated thereby. By longitudinal shifting of the clutch sleeve 97 to the left, as viewed in Fig. 1, until the cooperating ratchet teeth are disengaged, the feeding means can be relieved of the tension of the spring 88. This is the condition which exists when the magazine is being loaded. As the cartridges are inserted into the mouth by hand or by a machine shown in applicant's copending United States patent application Serial No. 408,157, filed August 25, 1941, they are forced around the spiral channels until, when the magazine is fully loaded, the roller 85 will engage the stud 98 (Fig. 3) extending from the side plate 63. After the magazine has been loaded, the clutch sleeve 97 is engaged with the sleeve 89, and a wrench (not shown) is placed over the sleeve 89, where it cooperates with the tenons 99 and 100 thereon to rotate the sleeve 89 and apply a tension to the spring 88, which tension is transmitted through the clutch sleeve 97 and the shaft 74 to the feeding means to urge the cartridges toward the mouth of the magazine. An indicator (not shown) indicates when the spring is fully tensioned.

As the cartridge feeding means operates to move cartridges into the mouth of the magazine 61 to replace those used by the gun, the tension in the spiral spring 88 is gradually decreased. However, in order that the feeding means will operate properly to present cartridges to the gun as fast as they are used, the spring 88 must always have more than a predetermined tension remaining therein after the last cartridge has been removed from the magazine 61.

*Testing mechanism*

The novel mechanism for testing the operation of the magazine, which will now be described, tests for the proper operation of the cartridge feeding means and the operation of the indicating plunger 87.

The magazine 61 to be tested is loaded with dummy cartridges, either by hand or mechanically, and tension is applied to the cartridge feeding means to cause the feeding means to be operable to move cartridges into the mouth of the magazine. The loaded magazine is then placed on the testing mechanism.

A table 101 (Figs. 1, 2, 3, 5, 6, 10, 11, and 12) is provided for supporting the magazine 61 to be tested and also a clip 102, in which the ejected cartridges are stored, which table is supported at a convenient height by side members or legs 103 and 104 (Fig. 1), which are fastened to the table 101 and to a base 105 by corner plates 106, 107, 108, and 109.

The top of the table 101 has therein an opening 110 (Figs. 1, 2, and 12), into which the mouth of the magazine extends. The magazine is held in place on the testing mechanism by means of the studs 71 and 72 on the left-hand side of the mouth of said magazine, which studs slip under rounded hooks 111 formed on a bracket 112 fastened to said table (Fig. 2), and by means of the lip 73 on the right-hand side of said magazine (Fig. 14), which lip rests on the upper surface of an extension of a bracket 114 secured to the top surface of the table 101, said lip being clamped against the surface of the extension by a sliding bolt 115, which is adapted to pass thereover. The sliding bolt 115 fits freely in a slot in the bracket 114, and said bolt has therein a slot adapted to be engaged by a rounded extension on the handle 116 pivoted on a pin 117 in an upward extension of said bracket 114.

To place a magazine on the testing mechanism, the handle 116 is pivoted counter-clockwise about the pin 117 to move the bolt 115 into the bracket, then the magazine is tilted towards the left, and the mouth thereof is placed in the opening 110, so that the studs 71 and 72 extend under the hooks 111 on the bracket 112, after which the right-hand side of the magazine is lowered until the lip 73 rests on the upper surface of the extension of the bracket 114, and, finally, the handle 116 is pivoted clockwise about the pin 117 to move the bolt 115 over the lip 73. The handle 116 is retained in either of its positions by means of a spring-pressed plunger 118, which fits in a hole 119 in the handle 116 to keep the handle in locking position and engages the surface 120 (Fig. 1) on the handle to retain the pin in unlocking position.

The bottom of the opening 110 communicates with the recess 121 in the bottom of the table 101 (Figs. 1, 2, 3, and 12), through which recess an ejecting means is moved to engage the cartridges and eject them from the magazine.

*Cartridge ejecting means*

The ejecting means, which is operable to eject cartridges from the magazine longitudinally and one at a time at a speed approximating that encountered when the magazine is used on a gun, will now be described.

A motor 122 (Figs. 3 and 6) and a reduction gearing shown generally at 123 are fastened to the base 105 and rotate a drive shaft 124, to which is fastened a disk 125. Pivotally mounted on pins 126 (Figs. 1 and 9) in a peripheral groove 127 in said disk are a plurality of similar ejector fingers 128, which are normally urged clockwise about their pivot pins 126 by spring-urged plungers 129 located in recesses in the disk 125. Each ejector finger 128 is formed with a hook 130, which is adapted to pass through the opening 113 (Fig. 14) in the right-hand side of the magazine and engage a cartridge in the mouth of the magazine and eject this cartridge from the magazine as the disk 125 is rotated.

The operation of the motor 122 is initiated by depression of a start button 153 to close a motor control switch 152 contained in a housing 131 mounted on the table 101. The motor control switch 152 is shown in the schematic diagram of the motor circuit illustrated in Fig. 15. When the switch 152 is closed and the motor is operating, it drives the disk 125 at such a speed that the rate at which the cartridges are ejected by the ejector fingers 128 is approximately the same as the rate at which the cartridges are fired from the gun. The ejector fingers have thereon pins 132, which cooperate with arcuate slots 133 in the disk 125 to limit the extent of the pivotal movement of the fingers. Extending from opposite sides of the free end of each of the ejector fingers 128 are rollers 134 and 135 cooperable with a control member 136. As shown in Fig. 9, the control member 136 may occupy an upper position, shown in the full lines in this figure, or a lower position, shown in dot-and-dash outline. In its upper position, the control member 136 guides the fingers 128 relative to the magazine 61 to impart the proper motion thereto when they are in engagement with the cartridges, and, in its lower position, the control member 136 moves the fingers clockwise to an ineffective position to prevent their cooperation with and the ejection of the cartridges.

The control member 136 is pivotally supported by bearing blocks 137 and 138 fastened to the table 101 and is slotted throughout a portion of its length to provide a pair of cams 139 and 140, which extend into the recess 121, straddle the disk 125, and cooperate with the rollers 134 and 135 on the ejecting fingers 128. The cams 139 and 140 are so shaped that, when the control member 136 is in its upper position, they will engage the rollers 134 and 135 on the fingers 128 just before the hooks 130 engage the cartridges, and will rock the fingers first slightly clockwise and then allow them to rock counter-clockwise as they move past the mouth of the magazine, so that the arcuate movement of the hooks 130 will be changed to a linear movement while they are ejecting cartridges from the magazine. The rollers 134 and 135 can enter into arcuate slots 141 in the sides of the groove 127 when the fingers 128 are rocked clockwise by the control member.

It will be remembered that the plunger 87 engaging the web 94 limits the downward movement of the block 82, the finger 83, and the roller 84 when the magazine is empty, as shown in dot-and-dash outline in Fig. 14. The path of the hooks 130 as determined by the control member 136 is such that they cannot engage the roller 84 or the finger 83 if the ejector fingers 128 should be moved through the mouth of the magazine after all the cartridges have been removed therefrom.

In the lower position of the control member 136, the cams 139 and 140 engage the rollers 134 and 135 to rock the ejecting fingers clockwise so that the hooks 130 will be moved completely within the peripheral groove 127 of the disk 125 and out of engagement with the cartridges during their movement past the magazine. Thus it is seen that the position of the control member 136 controls whether or not the ejecting means will be operative to eject the cartridges from the magazine.

The operation of the ejecting means is as follows:

As the disk 125 rotates, the ejecting fingers will be urged counter-clockwise by centrifugal force, assisted by the plungers 129, to their normal position, in which the pins 132 engage the outer ends of the slots 133. When the control member 136 is in its upper position and the hooks 130 approach the magazine, the rollers 134 and 135 will engage the cams 139 and 140, and the ejecting fingers 128 will be gradually rocked clockwise until the hooks 130 are over the shaft 124, after which the cams 139 and 140 allow the fingers to be gradually rocked counter-clockwise, thus providing a linear movement to the hooks 130 as they pass the magazine. After the cartridges have been ejected, the rollers 134 and 135 will leave the cams 139 and 140, and the fingers 128 will rock the remaining distance counter-clockwise to their normal positions. When the disk 125 is rotating and the control member 136 is in its lower position, the rollers 134 and 135 will engage the cams 139 and 140 on the control member 136 as the ejecting fingers 128 approach the magazine, and the fingers will be rocked clockwise, so that the hooks 130 are moved completely within the peripheral groove of the disk and will not contact the cartridges, thus preventing the ejection of the cartridges. After the fingers have passed the magazine, the rollers 134 and 135 leave the cams 139 and 140 on the control member 136, and the fingers resume their normal position.

The control member 136 may be moved to its upper position or to its lower position by means of a handle 142 in the following manner:

The control member 136 has thereon an extension 143, which passes through a slot 144 in the side member 104 and limits the pivotal movement of the control member. The handle 142 is pivotally mounted on the inside of the side member 104 by means of trunnions 145 and 146 extending into blocks 147 and 148 fastened to the inside surface of said wall, and extends through said slot 144, which determines its upper and lower limits of movement. Pivoted at 149 on the handle 142 is a member 150 containing a spring-urged plunger 151, which has a recess in the end thereof to engage the end of the extension 143 and form a toggle action. Referring to Fig. 13, it will be seen that, in order to move the control member 136 to its upper position, the handle 142 is pulled down, and this will cause the plunger 151 in the member 150 to engage the under side of the end of the extension 143 and shift the control member 136 to its upper position and retain it in said position. When the handle 142 is moved to its upper position, the plunger 151 will force the control member 136 to its lower or disabling position and retain it in said position. The coaction between the plunger 151 and the extension 143 will also act to retain the handle 142 in either its upper position or its lower position. The handle 142 may be moved from its upper position to its lower position or vice versa at any time during an operation of emptying a magazine, and can cause cartridges to be ejected in bursts, similar to the manner in which they would be fired from a gun. With this control of the setting of the member 136, it is not necessary that the magazine be emptied before the ejecting means can be disabled.

The immediate positioning of the control member 136 by the manipulation of the handle 142, as described above and shown in Fig. 13, provides a simple, efficient control of the effectiveness of the ejecting means.

A delayed-action operation of the positioning means—namely, one in which the plunger 151 in the handle 142 tends to move the control member 136 but the control member is held against movement until it is released by other control means—may be obtained by providing a latch for the control member 136 and providing means to control the operation of the latch. Such a mechanism is shown applied to the control member 136 in Figs. 1, 10, 11, and 12. Pivoted in a slot 156 in the extension 143 of the control member is a latch 157, which is urged counter-clockwise about its pivot into engagement with a latch plate 158, carried by the side member 104, by means of a spring 159 fastened to the table 101 and engaging the latch near the upper end thereof in both the upper position and the lower position of the control member 136. When the control member 136 is in its lower or disabling position, the latch 157 will engage under the shoulder 160 (Fig. 12) on the latch plate 158, and, upon the movement of the handle 142 to its lower position, the plunger 151 cannot move the control member 136 to its upper position, but will apply an upward pressure to the extension 143, which tends to move it to its upper position.

In order to release the latch 157 from the shoulder 160, a release pin 161 (Figs. 10, 11, and 12) is provided. This pin is mounted in a recess 162 in the table 101 and extends through the side member 104 and the latch plate 158 at a point just below the shoulder 160. A spring 163, compressed between the side member 104 and a shoulder on the release pin 161, urges said pin to the left until the pin engages one end of a release pin actuating lever 164 pivoted in a slot in said table 101. The other end of the release pin actuating lever 164 extends from the side of the table 101, and, when this projecting end is moved to the left, as viewed in Figs. 10 and 11, it will shift the release pin 161 to the right, and the release pin 161 will move the end of the latch 157 from beneath the shoulder 160.

It is therefore seen that, with the delayed-action operation of the control member 136, in order to move the control member 136 from its lower or ejecting means disabling position to its upper or ejecting means enabling position, it is first necessary to move the handle 142 to its lower position and then operate the release pin actuating lever 164 to move the release pin 161 to the right, which pushes the latch 157 clockwise from beneath the shoulder 160, so that the plunger 151 can move the control member 136 to its upper position.

When the control member 136 is in its upper position (Figs. 1 and 12), the latch 157 will engage over the shoulder 165 on the latch plate 158 and retain the control member 136 in this position. Upon movement of the handle 142 to its upper position, the plunger 151 cannot move the control member 136 to its lower position, because of the action of the latch 157, but will apply a downward pressure to the extension 143 and tend to move the control member 136 to its lower position.

An upper latch release pin 166 (Fig. 12) is provided to move the latch 157 from engagement with the shoulder 165 and allow the plunger 151 to move the control member 136 downwardly to disable the ejecting means. The release pin 166 is mounted in a recess 167 in the table 101, and the right-hand end of the pin extends through the side member 104 and the latch plate 158 at a point just above the level of the shoulder 165. The left-hand end of the pin 166 engages a downwardly-extending arm 168 of a bell crank 169 mounted for pivotal movement in a slot 170 in the top of the table 101 by means of a pin 171, which is supported by bearing blocks 172 and 173 fastened to the table 101. A spring 174, compressed between the side member 104 and a shoulder on the release pin 166, urges said pin toward the left and, through the contact of the left-hand end of the pin and the arm 168 of the bell crank, urges the bell crank 169 clockwise about its pivot pin 171 until a horizontal arm 175 of the bell crank engages the under side of the bracket 114.

From the above description of the magazine, it will be recalled that the indicating plunger 87 will move to the right, as viewed in Figs. 1 and 14, into the opening 93 in the mouth of the magazine when the last cartridge is moved into position to be removed from the magazine, and will move through the opening and also downward with the feeding means to the position shown in dot-and-dash lines in Fig. 14, after the last cartridge has been removed from the magazine. The plunger 87 is used to cause operation of the upper release pin 166 to terminate an operation of the testing mechanism if the feeding means and the plunger have operated properly.

The left end of the horizontal arm 175 of the bell crank 169 (Figs. 1, 12, and 14) extends into the path of the movement of the plunger 87 when the plunger 87 is moved by the cartridge feeding means after the last cartridge has been ejected from the magazine. The spring 174, which urges the pin 166 to the left, as seen in Fig. 12, is sufficiently strong to prevent the operation of the bell crank 169 by the plunger 87 if the tension in the spring 88, which drives the feeding means, does not exceed a predetermined minimum which is necessary to the proper operation of the feeding means.

If the force imparted to the feeding means by the spring 88 is sufficient to overcome the action of the spring 174, the plunger 87, in its downward movement, will engage the end of the arm 175 and rock the bell crank 169 counter-clockwise. This counter-clockwise movement of the bell crank 169 will move the end of its downwardly-extending arm 168 to the right and cause the release pin 166 to move to the right and shift the latch 157 from the shoulder 165, releasing the control member 136 for movement to its lower or ejecting means disabling position and thus providing for the automatic termination of the ejecting operation when the magazine has been emptied.

It is therefore seen that, with the delayed-action operation of the control member 136, in order that the control member can be moved from its upper or ejecting means enabling position to its lower or ejecting means disabling position, it is first necessary to move the handle 142 to its upper position so that the plunger 151 can apply a downward pressure on the control member 136, and then it is necessary to eject all the cartridges from the magazine so that the plunger 87 can operate means to move the release pin 166 to the right (Fig. 12) if the cartridge feeding means has operated properly, which pin will move the latch from the shoulder 165, allowing the plunger 151 to move the control member 136 to its lower position.

The movement of the release pin 166 to the right when the magazine 61 is empty is also used to open the circuit (Fig. 15) which causes the operation of the motor 122. A stud 176 (Figs. 1, 10, and 12) is fastened to the release pin 166, extends through an aperture in the top of the table 101 at a point adjacent the housing 131 for the motor control switch 152, and can cooperate with a member 177 carried by the housing and operable to open the motor circuit. When the release pin 166 is shifted to the right by the bell crank 169 after the last cartridge has been ejected from the magazine, the stud 176 will operate the member 177 to cause the switch 152 to be opened and the motor circuit to be interrupted.

In testing mechanisms which use the simplified control of the control member 136 as shown in Fig. 13, the above motor switch control, consisting of the bell crank 169, the pin 166, the spring 174, the stud 176, and the member 177, is also utilized and is similarly operated by the plunger 87 to open the motor circuit upon the proper operation of the cartridge feeding means after all the cartridges have been ejected from the magazine.

The mechanism shown in Figs. 1, 10, 12, and 14, by which the cartridge feeding mechanism can operate a signal to indicate whether or not the cartridge feeding means has operated properly, may be replaced by the mechanism shown in Figs. 16 and 17 for accomplishing this purpose. In this form of the mechanism, the signal operating member is locked against operation by the feeding means until the indicating plunger has moved its full extent through the opening in the mouth of the magazine and has released the lock.

As shown in Figs. 16 and 17, a locking bolt supporting bracket 214 is fastened to the table 101 and slidably supports a locking bolt 215, which can engage over the lip 73 on the magazine 61 and clamp the right-hand side of the mouth of the magazine against a pair of studs 216 (only one shown) fastened to the table and supporting this side of the magazine. The bracket 214 is provided with a slot 217 opposite the magazine. A locking pawl 219 is pivotally supported in said slot 217 by means of a pin 218 carried by the bracket 214, and this pawl 219 is normally urged clockwise by spring 220 until its upper end engages the bracket 214. The end of the locking bolt 215 is slotted at 221 so as not to interfere with the operation of the pawl 219.

The signal operating member 275 (Figs. 16 and 17) corresponds to the arm 175 shown in Fig. 12, but has a slightly different form. The member 275 has an opening 222, through which the locking pawl 219 extends. Protruding from opposite sides of the locking pawl 219 is a pair of studs 223, which engage the under side of the member 275 when the pawl is in its normal position and prevent the operation of the member 275.

The locking pawl 219 is formed with a cam surface 224, which is engaged by the plunger 87 as it moves through the opening 93 in the mouth of the magazine after the last cartridge has been ejected from the magazine. When the cartridge feeding means operates after the removal of the last cartridge from the magazine, it will carry the plunger 87 with it. At this time, the plunger will also move to the right through the opening 93 and will rock the locking pawl 219 counterclockwise about its pivot 218, the cooperation between the plunger 87 and the locking pawl 219 being such that, if the plunger 87 moves through the opening 93 an amount which would stop the firing of the gun if the magazine were in actual use, the locking pawl will be rocked until the studs 223 on the pawl move opposite the widened portions 225 of the opening 222 and allow the end of the member 275 to be moved downward by the plunger if the force applied to the cartridge feeding means exceeds the necessary predetermined amount. Since the member 275, when it is moved by the plunger, is used to cause an operation of mechanism similar to that shown in Fig. 12 to provide an indication of the correct operation of the magazine, the mechanism which is operated by the member 275 will not be shown nor described, and reference may be had to Fig. 12 for the details thereof.

It is seen from the above that, with the form of signal control mechanism shown in Figs. 16 and 17, the mechanism for causing an operation of the signal is positively locked against operation unless the indicating plunger 87 has moved through the opening 93 in the mouth of the magazine properly and has released the lock. After the mechanism is unlocked, it can operate if the carriage feeding means has more than a predetermined force applied thereto after the last cartridge is fed from the magazine, and can signal that the magazine has operated properly.

The operation of the signal operating mechanism either to open the motor circuit or to open the motor and release the control member is utilized to notify the operator of the testing mechanism that the cartridge feeding means and the indicating plunger are working properly.

If, when the simplified form (Fig. 13) of positioning means for the control member 136 is used, the motor is stopped when cartridges can no longer be ejected from the magazine, the operator of the testing mechanism will know that the plunger 87 and the cartridge feeding means have operated properly and have rocked the bell crank 169, or the member 275, and opened the motor circuit. On the other hand, if the testing mechanism motor continues to operate after cartridges can no longer be ejected from the magazine, it will be an indication that either the plunger 87 or the cartridge feeding means has not operated properly and that the bell crank 169 or the member 275 has not been rocked by the plunger, because the rocking of the bell crank by the plunger requires that the plunger shall operate properly and move into the opening in the mouth of the magazine when the last cartridge is in the mouth of the magazine, and further requires that the plunger shall move through the opening and that the feeding means shall operate properly and move the plunger 87 downward with sufficient force to rock the bell crank 169 or the member 275 against the action of the spring after the last cartridge has been ejected from the magazine.

In a similar manner, when the delayed-action control is used, if the motor is stopped and the latch 157 is released from its upper position, these conditions will signal that the cartridge feeding means and the indicating plunger 87 have operated properly to rock the bell crank 169 or the member 275. If the motor continues to run and the control member remains in its upper position after cartridges are no longer ejected from the magazine, the operator of the testing mechanism will know that the plunger and/or the cartridge feeding means have not operated properly.

While, in the disclosed embodiments of the invention, the indication of the proper or improper operation of the feeding means and the plunger consists in the interruption or continued operation of the motor, it is obvious that the signal operating bell crank could operate any other form of signaling device without departing from the invention.

*Cartridge receiving means*

As the cartridges are ejected from the magazine 61, they enter a channel 178 (Fig. 2) in the table 101 and strike against a shock absorber, which takes up the energy of the ejected cartridge. The shock absorber is composed of an impact member 179 urged to the right by a spring 180 compressed between the impact member 179 and a plug 181 threaded in the side member 103. A flange 182 on the impact member 179 engages shoulders 183 in the channel 178 to limit the movement of the impact member 179 toward the right. The plug 181 provides a means for adjusting the compression of the spring 180.

Mounted in a cut-away portion 184 of the table 101 is a rebound-preventing pawl 185. The pawl 185 is located at the mouth of the channel 178 and to the left of the opening 110, so that, as cartridges are ejected from the magazine, they will pass the pawl as they enter the channel 178. A spring 186, located in an opening in the top of the table 101, is compressed between the bracket 112 and an arm 187 of the pawl 185 and urges said pawl counter-clockwise about its pivot 188 until a stop portion 189 engages the table 101, at which time the end of the arm 187 extends a slight distance below the top wall of the channel 178. When the cartridges pass into the channel 178, they will, in passing the pawl 185, engage the arm 187 and rock the pawl clockwise against the action of the spring 186, but, as soon as the cartridge has passed the pawl 185, the spring 186 will rock the end of the arm 187 down, so that it can engage the rear surface of the cartridge and prevent any rebound which might occur due to the action of the shock absorber.

A clip 102 (Fig. 6) is provided for receiving and storing the ejected cartridges. The mouth of the clip 102 (Figs. 1, 3, 6, and 10) extends into a rectangular opening 190 in the side of the table 101, and the clip is held in place in this opening by means of a band 191 fastened to the clip 102 and engageable by retaining fingers 192 on a plate 193 pivoted to the top of the table 101. The plate 193 is locked with the fingers 192 in engagement with the band 191 by means of a pivoted locking member 194, which, after passing through a slot 195 in the plate 193, may be turned at right angles to the slot, as is clearly shown in Fig. 10. The clip 102 is also supported by a member 205 (Fig. 3) extending from the base 105.

The opening 190, in which the mouth of the clip 102 is held, communicates with the channel 178 and enables a pusher slide 196 carried in the table 101 to move the cartridges from the channel 178 into the clip 102, where they are retained by opposed spring fingers 197 and 198, which prevent the cartridges from rolling back into the channel 178 and interfering with the further ejection of cartridges from the magazine 61.

As seen in Figs. 1, 5, and 6, the pusher slide 196 is mounted in the table 101 for sliding movement across the channel 178 and into the mouth of the clip 102 to move the cartridges out of the channel. A lever 199 for operating the slide 196 is pivoted at its lower end in a block 200 fastened to the base 105 and has an upper rounded end extending into a slot in the slide 196. At a point about midway the length of the lever 199 is a roller 201, which extends into a cam groove 202 in a cylindrical cam 203 fastened to and rotatable with the disk 125. The cam groove 202 is so shaped, as at 204, that it will cause the lever 199 to rock about its pivot and shift the slide 196 first to the left, as shown in Fig. 6, into the channel 178 to move the cartridge out of the channel and into the clip 102 and then shift the slide 196 back out of the path of the next cartridge being ejected from the magazine 61. The slide 196 will make one excursion for each possible ejection of the cartridges by the fingers 128, and its operation is so timed that it will always clear the channel 178 of one ejected cartridge before the next cartridge is ejected from the magazine.

The cartridge receiving means, therefore, accepts the ejected cartridges, absorbs the force due to their ejection, and stores them in a clip from which they may be fed by a machine, as shown in said application Serial No. 408,157, into another magazine to be tested.

The provision of cartridge receiving means which can stop the ejected cartridges in a small space, together with the use of dummy cartridges, enables magazines to be tested in a very small space without requiring a rifle range or other special construction which would be necessary if the magazines were tested by firing cartridges from a gun.

OPERATION

It is believed that the operation of the testing mechanism is clear from the above detailed description; therefore only a brief summary of the operation will be given.

In order to test the magazine, the magazine is first loaded with dummy cartridges, and the operating spring for the cartridge feeding means is placed under tension. The loaded magazine 61 and an empty clip 102 are clamped to the table 101, and the motor starting button 153 is operated to close the motor circuit and cause the motor to operate. The motor 122 drives the disk 125, which carries the ejecting fingers 128, and also drives the cam 203, which operates the pusher slide 196, at such a speed that the rate at which the cartridges are ejected from the magazine by the ejector fingers and stored in the clip by the pusher slide approximates the rate at which they must be fed into the gun.

With the delayed-action control shown in Figs. 1, 10, and 12, the handle 142 is moved to its lower position and the release pin actuating lever 164 is operated, which results in the control member 136 being moved to its upper position.

With the control member in its upper position, the ejector fingers 128 then engage the cartridges as the disk rotates and moves them from the magazine into the channel 178, where they are stopped by the shock absorber and are then fed into the clip 102 by the pusher slide 196 operated by the cam 203 in timed relation with the operation of the ejector fingers. The cartridges which are fed into the clip are thus stored so that they can be fed into another magazine and used over again to test other magazines.

After the control member 136 has moved to its upper position, the handle 142 is moved to its upper position to enable the control member to be moved to its lower or ejecting means disabling condition. However, the control member will be latched in its upper position by a latch 157 until the last cartridge has been ejected from the magazine. After the last cartridge has been ejected from the magazine, if the cartridge feeding means and the indicating plunger 87 operate properly, the plunger 87 will operate the signal operating bell crank and shift the pin 166 against the action of the spring 174, to release the latch 157 from the shoulder 165 and move the motor circuit breaking member 177 and terminate the operation of the testing mechanism.

If either the cartridge feeding means in the magazine or the indicating plunger fails to work properly, the plunger will not operate the bell crank and its associated mechanism. This will cause the control member to remain latched in its upper position and the motor to continue operating after the ejecting means has ceased ejecting cartridges from the magazine, which conditions will notify the operator of the testing mechanism that either the plunger has not come through the opening 93 in the mouth of the magazine or the cartridge feeding means has not operated properly.

If the testing mechanism is equipped with the simplified control of the control member 136 by the handle 142, as shown in Fig. 13, the ejecting means is rendered effective as soon as the handle 142 is moved to its lower position and remains effective as long as the handle is in its lower position. When the handle is raised to its upper position, the control member 136 immediately assumes its lower or ejecting means disabling position. In this simplified control, the control member is not latched in its upper position during the emptying of the magazine, nor in its lower position, but can be moved from its upper position to its lower position and vice versa at any time during the emptying operation, so that, by the handle's being moved up and down during the emptying operation, the cartridges may be ejected in bursts similar to the manner in which the cartridges would be fired from a gun. When the simplified control is used, the cartridges will be ejected and stored in the clip in the usual manner, and the operation or non-operation of the bell crank and the pin 166 by the indicating plunger 87 to open the motor circuit when the magazine is empty, as explained above, is used to signal to the operator of the testing mechanism whether or not the cartridge feeding means and the indicating plunger are working properly.

From the foregoing it is seen that applicant has provided a simple mechanism which does not require any rifle range or other special construction and can be operated cheaply to test whether or not the cartridge feeding means and the indicating plunger of magazines operate properly.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a device for testing the operation of a cartridge magazine having a mouth from which cartridges may be ejected one at a time, and a feeding means for feeding the cartridges into said mouth, the combination of means controlled by said feeding means for indicating when the magazine is empty; ejecting means for ejecting dummy cartridges from the mouth of the magazine; driving means for said ejecting means; and means controlled by the indicating means to control the operation of the ejecting means by the driving means to cause the termination of an operation of the ejecting means if the feeding means has operated properly after the last cartridge has been ejected from the mouth of the magazine and to allow the driving means to continue to drive the ejecting means if the feeding means has not operated properly after the last cartridge has been ejected.

2. In a device for testing the operation of a cartridge magazine having a mouth from which cartridges may be removed one at a time, and a feeding means for feeding the cartridges into said mouth, the combination of means controlled by said feeding means for indicating when the magazine is empty; a plurality of members moved through the mouth of the magazine to successively engage dummy cartridges and remove them from the magazine; means for driving the members at such a speed that the frequency at which the cartridges are removed from the magazine corresponds to the frequency at which they would be removed if the magazine were being used on a gun; means for catching the removed cartridges; and means controlled by the indicating means to control the operation of the removing means and cause the termination of an operation of the removing means if the feeding means has operated properly after the last cartridge has been removed from the mouth of the magazine.

3. In a device for testing the operation of a cartridge magazine having a mouth from which cartridges may be ejected one at a time, and a feeding means for feeding the cartridges into said mouth, the combination of means controlled by said feeding means for indicating when the magazine is empty; a rotatable disk; a plurality of ejecting fingers on said disk and so located relatively to the magazine that they are movable through the mouth of the magazine in succession to engage dummy cartridges and remove the cartridges therefrom as the disk rotates; means for rotating the disk; and means controlled by the indicating means after the last cartridge has been removed from the magazine to control the rotating means and cause the rotation of the disk to stop if the indicating means has operated properly and the cartridge feeding means has operated properly after the last cartridge has been removed from the mouth of the magazine.

4. In a device for testing the operation of a cartridge magazine having a mouth from which cartridges may be ejected, the combination of ejecting means engageable with the cartridges to eject them, said ejecting means being disabled by being movable out of engaging relation with the cartridges; means cooperable with the ejecting means for controlling the cooperation of the ejecting means with the cartridges and settable to positions in which the ejecting means is effective or ineffective; a latch for retaining the control means in either of its positions; manipulative means including a spring-urged member for applying an actuating force to the control means to move it from one position to the other; manipulative means to release the latch when the control means is in its disabling position and allowing the spring-urged member to move the control means to its enabling position; and means controlled by the cartridge magazine to release the latch when the control means is in enabling position and the magazine is empty, to allow the spring-urged member to move the control means to its disabling position.

5. In a device for testing the operation of a cartridge magazine having a mouth from which cartridges may be ejected one at a time, a cartridge feeding means including a member engageable with the cartridges and movable to feed the cartridges into the mouth, and a spring connected to said member for applying a force to the member to feed the cartridges into the mouth of the magazine, said feeding means being operated properly if the spring applies more than a predetermined force to the member after the last cartridge has been ejected from the magazine, the combination of means for ejecting dummy cartridges from the magazine; an element operable by the cartridge feeding means after the last cartridge has been ejected from the magazine; and means to apply a resisting force to said element, which resisting force is equal to said predetermined force, to prevent the element from being operated by the feeding means if the force applied to the feeding means by the spring does not exceed said predetermined force, whereby the proper or improper operation of the feeding means can be determined by whether or not the element is operated.

6. In a device for testing the operation of a cartridge magazine having a mouth from which cartridges may be ejected one at a time, cartridge feeding means including a member movable to feed the cartridges into the mouth, indicating means carried by the member to indicate when the magazine is empty, and a spring connected to said member for applying a force to the member to feed the cartridges into the mouth of the magazine, said member being operated properly if the spring applies more than a predetermined force to the member to move the member after the last cartridge has been ejected from the magazine, the combination of means for ejecting dummy cartridges from the magazine; an element engaged by the indicating means carried by the member as the member is operated after the last cartridge has been ejected from the magazine; and means to apply a resisting force to the element, which resisting force is equal to said predetermined force, to prevent the element from operating if the force imparted to the member by the spring does not exceed said predetermined force.

7. In a device for testing the operation of a cartridge magazine having a mouth from which cartridges may be ejected one at a time, cartridge feeding means including a member movable to feed the cartridges into the mouth, indicating means carried by the member to indicate when the magazine is empty, and a spring connected to said member for applying a force to the member to feed the cartridges into the mouth of the magazine, said member being operated properly if the spring applies more than a predetermined force to the member to move the member after the last cartridge has been ejected from the magazine, the combination of means for ejecting dummy cartridges from the magazine; an element engaged by the indicating means carried by the member after the last cartridge has been ejected from the magazine; means to apply a resisting force to the element equal to said pre-determined force to prevent the element from operating if the force imparted to the member by the spring does not exceed said predetermined force; and a signal operated by the element if the feeding member has operated properly after the last cartridge has been ejected from the magazine.

8. In a device for testing the operation of a cartridge magazine having a mouth from which cartridges may be ejected one at a time, cartridge feeding means including a member movable to feed the cartridges into the mouth, indicating means carried by the member to indicate when the magazine is empty, and a spring connected to said member for applying a force to the member to feed the cartridges into the mouth of the magazine, said member being operated properly if the spring applies more than a predetermined force to the member after the last cartridge has been ejected from the magazine, the combination of means for ejecting dummy cartridges from the magazine; an element engaged by the indicating means carried by the member after the last cartridge has been ejected from the magazine; means to apply a resisting force to the element equal to said predetermined force to prevent the element from operating if the force imparted to the member by the spring does not exceed said predetermined force; and a control member operated under control of said element to disable the ejecting means if the feeding member has operated properly after the magazine has been emptied of the dummy cartridges and has caused the indicating means to move the element.

9. In a device for testing the operation of a cartridge magazine having a mouth from which cartridges may be ejected one at a time, a cartridge feeding means including a member movable to feed the cartridges into the mouth, indicating means carried by the member to indicate when the magazine is empty, and a spring connected to said member for applying a force to the member to feed the cartridges into the mouth of the magazine, said member being operated properly if the spring applies more than a predetermined force to the member after the last cartridge has been ejected from the magazine, the combination of means for ejecting dummy cartridges from the magazine; a control member settable to one position to render said ejecting means operable and to another position to disable said ejecting means; means for latching the control member in said one position; actuating means tending to move said control member to said other or disabling position; an element engaged by the indicating means carried by the member, after the last cartridge has been ejected from the magazine; a tension device operable to apply a resisting force to the element, equal to said predetermined force, to prevent the element from being operated when it is engaged by the indicating means if the force imparted to the member by the spring does not exceed said predetermined force; and means operated by the element to release the latching means for the control member and allow the actuating means to move the control member to its ejecting means disabling position, whereby the ejecting operation will be terminated if the cartridge feeding means has operated properly upon the emptying of the magazine.

10. In a device for testing the operation of a cartridge magazine having a mouth from which cartridges may be ejected one at a time, cartridge feeding means including a member movable to feed the cartridges into the mouth, indicating means carried by the member to indicate when the magazine is empty, and a spring connected to said member for applying a force to the member to feed the cartridges into the mouth of the magazine, said member being operated properly if the spring applies more than a predetermined force to the member after the last cartridge has been ejected from the magazine, the combination of means for ejecting dummy cartridges from the magazine; a motor for driving said ejecting means; an operating circuit for said motor; means to close said circuit to cause the motor to operate and drive said ejecting means; means to interrupt said circuit to cause the motor to cease operating and driving the ejecting means; an element engaged by the indicating means carried by the member after the last cartridge has been ejected from the magazine; means to apply a resisting force to the element, which resisting force is equal to said predetermined force, to prevent the element from operating if the force imparted to the member by the spring does not exceed said predetermined force; and means operated by the element to operate the circuit interrupting means to cause the motor to cease operating and driving the ejecting means when the cartridge feeding member has operated properly upon the emptying of the magazine.

11. In a device for testing the operation of a cartridge magazine having a mouth from which cartridges may be ejected one at a time, cartridge feeding means including a member movable to feed the cartridges into the mouth, indicating means carried by the member to indicate when the magazine is empty, and a spring connected to said member for applying a force to the member to feed the cartridges into the mouth of the magazine, said member being operated properly if the spring applies more than a predetermined force to the member after the last cartridge has been ejected from the magazine, the combination of means for ejecting dummy cartridges from the magazine; a motor for driving said ejecting means; an operating circuit for said motor; means to close said circuit to cause said motor to operate and drive said ejecting means; means to interrupt said circuit to cause the motor to cease operating and driving said ejecting means; a control member settable to one position to render said ejecting means operable to engage and eject cartridges and to another position to prevent the ejecting means from engaging and ejecting cartridges; means for latching the control member in said one position; actuating means tending to move said control member to said other or disabling position; an element engaged by the indicating means carried by the member when the member is moved by its spring after the last cartridge has been ejected from the magazine; a tension device operable to apply a resisting force to the element, which resisting force is equal to said predetermined force and prevents the operation of the element by the indicating means if the force applied to the member does not exceed said predetermined force; and means operated by said element for operating said circuit interrupting means to stop the operation of the motor and also releasing said latching means and allowing the actuating means to move the control member to its ejecting means disabling position, whereby the operation of the ejecting means will be terminated if the cartridge feeding means has operated properly.

12. In a device for testing the operation of a cartridge magazine having a mouth from which cartridges may be ejected one at a time, cartridge feeding means including a member movable to feed the cartridges into the mouth, indicating means carried by the member and movable to indicate when the magazine is empty, and a spring connected to said member for applying a force to the member to feed the cartridges into the mouth of the magazine, said magazine being operated properly if the indicating means has moved to indicate that the magazine is empty and the spring applies more than a predetermined force to the member to move the member after the last cartridge has been ejected from the magazine, the combination of means for ejecting dummy cartridges from the magazine; an element engaged by the indicating means carried by the member as the member is operated after the last cartridge has been ejected from the magazine; a locking device for locking the element against movement; means on the locking device engaged by the indicating means, when it moves to indicating position, to unlock the element; and means to apply a resisting force to the element, which resisting force is equal to said predetermined force, to prevent the element from operating if the force imparted to the member by the spring does not exceed said predetermined force.

13. In a device for testing the operation of a cartridge magazine having a mouth from which cartridges may be ejected one at a time, and containing a cartridge feeding means including a member movable to feed the cartridges into the mouth, indicating means carried by the member and movable from within the magazine to indicate when the magazine is empty, and a spring connected to said member for applying a force to the member to feed the cartridges into the mouth of the magazine, said magazine being operated properly if the spring applies more than a predetermined force to the member to move the member after the last cartridge has been ejected from the magazine, the combination of means for ejecting dummy cartridges from the magazine; an element engaged by the indicating means carried by the member and movable thereby after the last cartridge has been ejected from the magazine; a locking device for preventing the movement of the element by the indicating means when it moves with the member; means on the locking device engaged by the indicating means to move the locking device and unlock the element when the indicating means has moved from within the magazine; means to apply a resisting force to the element equal to said predetermined force to prevent the element from operating if the locking device has not been operated or if the force imparted to the member by the spring does not exceed said predetermined force; and a signal operated by the element if the indicating means and the feeding member have operated properly after the last cartridge has been ejected from the magazine.

14. In a device for testing the operation of a cartridge magazine having a mouth from which cartridges may be ejected one at a time, and containing cartridge feeding means including a member movable to feed the cartridges into the mouth, indicating means carried by the member and movable from within the magazine a predetermined distance to indicate when the magazine is empty, and a spring connected to said member for applying a force to the member to feed the cartridges into the mouth of the magazine, said magazine being operated properly if the indicating means has moved said predetermined distance from within the magazine and the spring applies more than a predetermined force to the member after the last cartridge has been ejected from the magazine, the combination of means for ejecting dummy cartridges from the magazine; an element engaged by the indicating means carried by the member after the last cartridge has been ejected from the magazine; means to block the operation of the element, said blocking means being so located relatively to the magazine that the indicating means will move the blocking means to unblocking position when the indicating means moves said predetermined distance; means to apply a resisting force to the element equal to said predetermined force to prevent the element from operating if the force imparted to the member by the spring does not exceed said predetermined force; and a control member operated under control of said element to disable the ejecting means if the indicating means has moved said predetermined distance to remove the blocking means and if the feeding member has operated properly after the magazine has been emptied of the dummy cartridges and has caused the indicating means to move the element.

15. In a device for testing the operation of a cartridge magazine having a mouth from which cartridges may be ejected one at a time, containing a cartridge feeding means including a member movable to feed the cartridges into the mouth, indicating means carried by the member and movable from within the magazine a predetermined extent to indicate when the magazine is empty, and a spring connected to said member for applying a force to the member to feed the cartridges into the mouth of the magazine, said member being operated properly if the spring applies more than a predetermined force to the member after the last cartridge has been ejected from the magazine and said indicating means operating properly if it moves said predetermined extent, the combination of means for ejecting dummy cartridges from the magazine; a control member settable to one position to render said ejecting means operable and to another position to disable said ejecting means; means for latching the control member in said one position; actuating means tending to move said control member to said other or disabling position; an element engaged by the indicating means carried by the member, after the last cartridge has been ejected from the magazine; locking means normally preventing the operation of said element, but operable by said indicating means, when it moves said predetermined extent, to release the element; a tension device operable to apply a resisting force to the element, which resisting force is equal to said predetermined force, to prevent the element from being operated after it has been unlocked and when it is engaged by the indicating means if the force imparted to the member by the spring does not exceed said predetermined force; and means operated by the element to release the latching means for the control member and allow the actuating means to move the control member to its ejecting means disabling position, whereby the ejecting operation will be terminated if the indicating means and the cartridge feeding means have operated properly upon the emptying of the magazine.

16. In a device for testing the operation of a cartridge magazine having a mouth from which cartridges may be ejected one at a time, cartridge feeding means including a member movable to feed the cartridges into the mouth, indicating means carried by the member and movable from within the magazine a predetermined distance to indicate when the magazine is empty, and a spring connected to said member for applying a force to the member to feed the cartridges into the mouth of the magazine, said member being operated properly if the spring applies more than a predetermined force to the member after the last cartridge has been ejected from the magazine, and said indicating means being operated properly if it moves said predetermined distance, the combination of means for ejecting dummy cartridges from the magazine; a motor for driving said ejecting means; an operating circuit for said motor; means to close said circuit to cause the motor to operate and drive said ejecting means; means to interrupt said circuit to cause the motor to cease operating and driving the ejecting means; an element engaged by the indicating means carried by the member after the last cartridge has been ejected from the magazine; a locking device for preventing the operation of the element, said locking device being located so that the indicating means, when it moves said predetermined distance, will operate the device and unlock the element; means to apply a resisting force to the element, which resisting force is equal to said predetermined force, to prevent the element from operating if the force imparted to the member by the spring does not exceed said predetermined force; and means operated by the element to operate the circuit interrupting means to cause the motor to cease operating and driving the ejecting means when the indicating means and the cartridge feeding member have operated properly upon the emptying of the magazine.

17. In a device for testing the operation of a cartridge magazine having a mouth from which cartridges may be ejected one at a time, containing cartridge feeding means including a member movable to feed the cartridges into the mouth, indicating means carried by the member and spring urged from within the magazine a predetermined extent to indicate when the magazine is empty, and a spring connected to said member for applying a force to the member to feed the cartridges into the mouth of the magazine, said magazine being operated properly if the indicating means has moved said predetermined extent and if the spring applies more than a predetermined force to the member after the last cartridge has been ejected from the magazine, the combination of means for ejecting dummy cartridges from the magazine; a motor for driving said ejecting means; an operating circuit for said motor; means to close said circuit to cause said motor to operate and drive said ejecting means; means to interrupt said circuit to cause the motor to cease operating and driving said ejecting means; a control member settable to one position to render said ejecting means operable to engage and eject cartridges and to another position to prevent the ejecting means from engaging and ejecting cartridges; means for latching the control member in said one position; actuating means tending to move said control member to said other or disabling position; an element engaged by the indicating means carried by the member when the member is moved by its spring after the last cartridge has been ejected from the magazine; a rockable locking device normally locking the element against movement; a cam surface on the locking device, engageable by the indicating means when it moves said predetermined extent from within the magazine and rockable by the indicating means to release the element; a tension device operable to apply a resisting force to the element, which resisting force is equal to said predetermined force and prevents the operation of the element by the indicating means if the force applied to the member does not exceed said predetermined force; and means operated by said element for operating said circuit interrupting means to stop the operation of the motor and also releasing said latching means and allowing the actuating means to move the control member to its ejecting means disabling position, whereby the operation of the ejecting means will be terminated if the indicating means and the cartridge feeding means have operated properly.

18. In a device for testing the operation of a cartridge magazine having a mouth from which cartridges may be ejected, the combination of a rotatable disk located opposite said mouth; a plurality of ejecting fingers shiftably mounted on said disk at equally spaced points about its edge and operable to pass through said mouth of the magazine to eject cartridges therefrom; means to rotate said disk to move said fingers in succession past the mouth of the magazine; a control member settable to an enabling position and a disabling position; means on the ejecting fingers cooperable with said control member as the fingers pass the mouth of the magazine; said control member in its enabling position cooperating with the means on the ejecting fingers to cause the fingers to shift on the disk so that the curvilinear motion of the fingers is changed to linear motion relative to said magazine when the fingers pass through the mouth of the magazine and engage and eject the cartridges, and said control member in its disabling position cooperating with the means on the ejecting fingers to cause the fingers to shift on the disk so that they do not pass through the mouth of the magazine and do not engage the cartridges as the fingers are carried by the disk past the mouth of the magazine; and means to set the control member to its enabling or disabling position.

19. In a device for testing the operation of a cartridge magazine having a mouth from which cartridges may be ejected, the combination of a rotatable disk located opposite said mouth; a plurality of ejecting fingers pivotally carried by said disk at equally spaced points about its edge and operable to pass through said mouth of the magazine to eject cartridges therefrom; means to rotate said disk to move said fingers in succession past the mouth of the magazine; a control member settable to an enabling position and a disabling position and having camming means thereon to control the position of the ejecting fingers; means on the ejecting fingers cooperable with the camming means on said control member as the fingers pass the mouth of the magazine; the camming means on said control member cooperating with the means on the ejecting finfiers to cause the fingers to pivot on the disk, when the control means is in enabling position, so that the arcuate motion of the fingers is changed to linear motion when the fingers pass through the mouth of the magazine and engage and eject the cartriges, and the camming means on said control member cooperating with the means on the ejecting fingers to cause the fingers to pivot on the disk when the control means is in disabling position so that they do not pass through the mouth of the magazine or engage the cartridges as they are carried by the disk past the mouth of the magazine; and manipulative means to set the control member to its enabling or disabling positions.

20. In a device for testing the operation of a magazine loaded with cartridges, the combination of means cooperable with the cartridges in the magazine in succession for ejecting the cartridges one by one from the magazine; cartridge receiving means for receiving the ejected cartridges; a shock absorbing member in said cartridge receiving means against which the cartridge is ejected and which absorbs the energy of the ejected cartridge and arrests its movement; a rebound preventing means cooperating with said receiving means to engage the arrested cartridge and prevent its rebound from the shock absorbing means back into the ejecting means; a reciprocating slide movable into and out of said receiving means for moving each arrested cartridge from the receiving means; and means for reciprocating the slide in timed relation to the operation of the ejecting means to move the ejected cartridges from the receiving means as fast as they are ejected thereinto, to thereby make room for succeeding cartridges to be received from the ejecting means.

21. In a device for testing the operation of a magazine loaded with cartridges, the combination of a clip for storing said cartridges; a plurality of members movable relative to said magazine to successively engage said cartridges and eject them from the magazine; means for driving the members at such a speed that the frequency at which the cartridges are removed from the magazine corresponds to the frequency at which they would be removed if the magazine were being used on a gun; cartridge receiving means for receiving the ejected cartridges; means in the cartridge receiving means for arresting the movement of the ejected cartridges; transferring means for moving the cartridges from the cartridge receiving means into the clip; and means for operating the transferring means in timed relation to the movement of the members so that the transferring means makes an operation each time one of the members engages and ejects a cartridge from the magazine.

22. In a device for testing the operation of a cartridge magazine having a mouth from which cartridges may be removed one at a time, and a feeding means for feeding the cartridges into said mouth, the combination of means controlled by said feeding means for indicating when the magazine is empty; removing means for moving cartridges one at a time from the mouth of the magazine; a settable means which when set into one position controls the removing means for moving the cartridges out of the mouth of the magazine and when set into a second position controls the removing means to prevent the moving means from moving the cartridges out of the mouth of the magazine; and means operated by the indicating means when the last cartridge has been moved from the magazine to cause the settable means to move into said second position to disable the removing means if the feeding means has operated properly, said settable means being unaffected by the indicating means when the feeding means has not operated properly, so that the settable means remains in said one position to allow the ejecting means to continue to be effective.

23. In a device for testing the operation of a cartridge magazine having a mouth from which cartridges may be ejected, the combination of ejecting means engageable with the cartridges to eject them from the magazine, said ejecting means being disabled by being movable out of engaging relation with the cartridges; a movable support for the ejecting means; operating means to move the support whereby the ejecting means is operated; means cooperable with the ejecting means for controlling whether or not the ejecting means will engage the cartridges when the ejecting means is operated and settable to positions in which the ejecting means, when operated, is effective or ineffective to engage the cartridges; and manipulative means for setting the control means in either of its positions.

ROBERT M. WHITMORE.